US007181062B2

United States Patent
Ii et al.

(10) Patent No.: US 7,181,062 B2
(45) Date of Patent: Feb. 20, 2007

(54) MODULAR CLASSIFICATION ARCHITECTURE FOR A PATTERN RECOGNITION APPLICATION

(75) Inventors: David L. Ii, Owego, NY (US); Elliott D. Reitz, II, Bradenton, FL (US); Dennis A. Tillotson, Glen Aubrey, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 740 days.

(21) Appl. No.: 10/232,165

(22) Filed: Aug. 30, 2002

(65) Prior Publication Data

US 2004/0042651 A1 Mar. 4, 2004

(51) Int. Cl.
G06K 9/62 (2006.01)
(52) U.S. Cl. .................................................. 382/159
(58) Field of Classification Search ................ 382/156, 382/158, 159
See application file for complete search history.

(56) References Cited

U.S. PATENT DOCUMENTS

| | | | |
|---|---|---|---|
| 3,069,653 A | 12/1962 | Hirschfeld et al. | |
| 3,087,141 A | 4/1963 | Steinbuch et al. | |
| 3,745,527 A | 7/1973 | Yoshimura et al. | |
| 4,075,604 A | 2/1978 | Degasperi | |
| 4,231,014 A | 10/1980 | Ponzio | |
| 4,461,028 A | 7/1984 | Okubo | |
| 4,484,348 A | 11/1984 | Shizuno | |
| 4,641,347 A | 2/1987 | Clark et al. | |
| 4,760,604 A * | 7/1988 | Cooper et al. ............... | 382/155 |
| 4,797,937 A * | 1/1989 | Tajima ........................ | 382/101 |
| 4,835,720 A | 5/1989 | Ditto et al. | |
| 5,337,370 A | 8/1994 | Gilles et al. | |
| 5,337,371 A | 8/1994 | Gilles et al. | |
| 5,448,652 A | 9/1995 | Vaidyanathan et al. | |
| 5,572,628 A | 11/1996 | Denker et al. | |
| 5,805,710 A | 9/1998 | Higgins et al. | |
| 5,835,633 A * | 11/1998 | Fujisaki et al. ............. | 382/187 |
| 5,859,925 A | 1/1999 | Yaeger et al. | |
| 5,864,630 A | 1/1999 | Cosatto et al. | |

(Continued)

OTHER PUBLICATIONS

Kittler, Josef, Mohamad Hatef, Robert P.W. Duin, and Jiri Matas. "On Combining Classifiers". IEEE Transactions on Pattern Analysis and Machine Intelligence. Vol. 20. No. 3. Mar. 1998.*

(Continued)

*Primary Examiner*—Bhavesh M. Mehta
*Assistant Examiner*—Damon Conover
(74) *Attorney, Agent, or Firm*—Tarolli, Sundheim, Covell & Tummino LLP

(57) ABSTRACT

A method and computer program product are disclosed for use in classifying an input pattern into one of a plurality of output classes. A plurality of modular classifiers each represent a set of at least one associated output class. The modular classifiers are capable of being trained separately from the system. The classifiers select one of the associated output classes as a classification result and compute an associated confidence value. This confidence value possesses common significance across the plurality of modular classifiers.

A processing stage processes the confidence values from the plurality of modular classifiers. As a result of this processing, the processing stage selects an associated classification result.

19 Claims, 3 Drawing Sheets

U.S. PATENT DOCUMENTS

| | | | |
|---|---|---|---|
| 5,872,865 A | | 2/1999 | Normile et al. |
| 5,995,651 A | * | 11/1999 | Gelenbe et al. ............. 382/156 |
| 6,832,006 B2 | * | 12/2004 | Savakis et al. ............. 382/239 |
| 6,901,398 B1 | * | 5/2005 | Horvitz et al. ................. 707/5 |
| 6,944,319 B1 | * | 9/2005 | Huang et al. ............... 382/118 |
| 6,999,620 B1 | * | 2/2006 | Harville ...................... 382/173 |
| 7,016,885 B1 | * | 3/2006 | Mikhael et al. ............... 706/20 |
| 2002/0181785 A1 | * | 12/2002 | Gutta et al. ................. 382/225 |

OTHER PUBLICATIONS

Ho, Tin Kam, Jonathan J. Hull, and Sargur N. Srihari. "Decision Combination in Multiple Classifier Systems". IEEE Transactions on Pattern Analysis and Machine Intelligence. vol. 16, No. 1. Jan. 1994.*

Xu, Lei, Adam Krzyzak, and Ching Y. Suen. "Methods of Combining Multiple Classifiers and Their Applications to Handwriting Recognition". IEEE Transacations on Systems, Man, and Cybernetics. vol. 22, No. 3, May/Jun. 1992.*

* cited by examiner

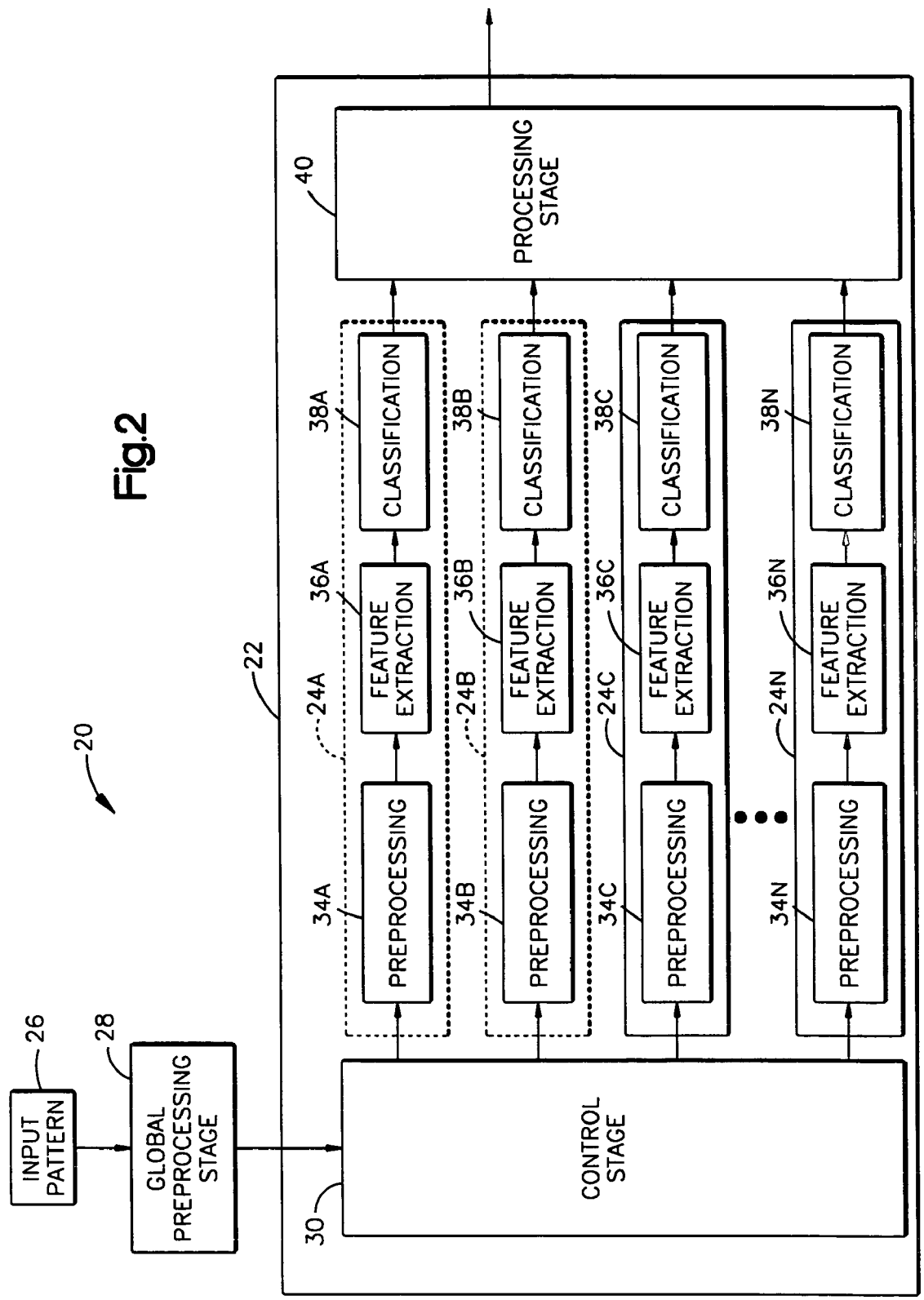

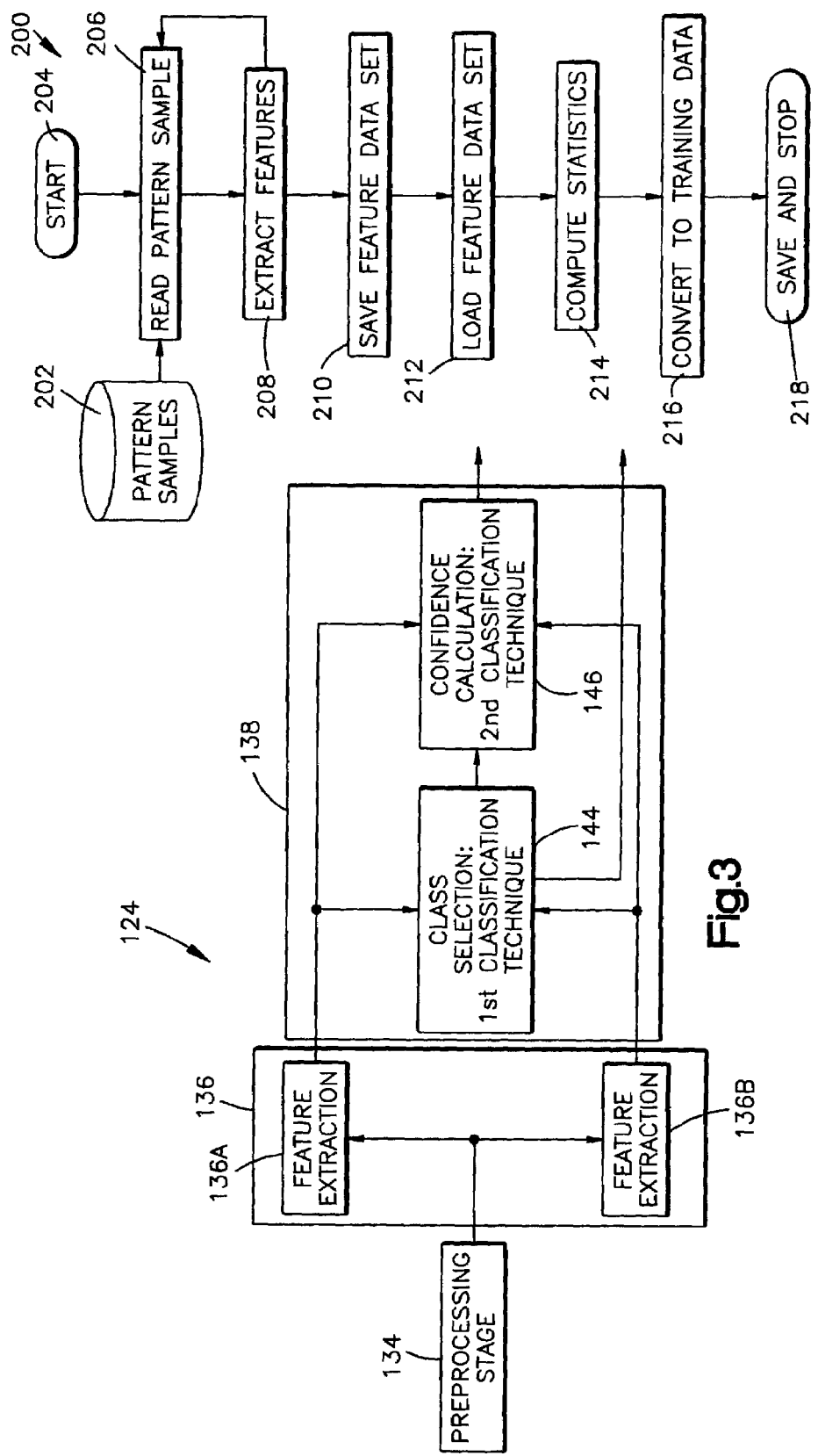

MODULAR CLASSIFICATION ARCHITECTURE FOR A PATTERN RECOGNITION APPLICATION

BACKGROUND OF THE INVENTION

1. Technical Field

The invention relates to a pattern recognition device or classifier. Image processing systems often contain pattern recognition devices (classifiers).

2. Description of the Prior Art

Pattern recognition systems, loosely defined, are systems capable of distinguishing between various classes of real world stimuli according to their divergent characteristics. A number of applications require pattern recognition systems, which allow a system to deal with unrefined data without significant human intervention. By way of example, a pattern recognition system may attempt to classify individual letters to reduce a handwritten document to electronic text. Alternatively, the system may classify spoken utterances to allow verbal commands to be received at a computer console.

A typical prior art classifier is trained over a plurality of output classes by a set of training data. The training data is processed, data relating to features of interest are extracted, and training parameters are derived from this feature data. As the system receives an input associated with one of a plurality of classes, it analyzes its relationship to each class via a classification technique based upon these training parameters. From this analysis, the system produces an output class and an associated confidence value.

In some applications, such as optical character recognition, the output classes stay substantially the same. In many others, however, output classes can change relatively frequently. In such systems, it is often necessary to change the output classes to reflect changes in the data population. In a prior art system as described above, this requires retraining the entire classification system. Such retraining is time consuming and potentially expensive. A system capable of adding and removing output classes without system-wide retraining would be desirable.

STATEMENT OF THE INVENTION

In accordance with the one aspect of the present invention, a computer program product operative in a data processing system is disclosed for use in classifying an input pattern into one of a plurality of output classes. A plurality of modular classifiers each represent a set of at least one associated output class. The modular classifiers are capable of being trained separately from the system. The classifiers select one of the associated output classes as a classification result and compute an associated confidence value. This confidence value possesses common significance across the plurality of modular classifiers.

A processing stage processes the confidence values from the plurality of modular classifiers. As a result of this processing, the processing stage selects an associated classification result.

In accordance with another aspect of the invention, a method is disclosed for classifying an input pattern into one of a plurality of output classes via a modular classification architecture. An output class is selected at each of a plurality of modular classifiers. Each modular classifier has at least one associated output class. The selected output class is the associated output class most likely to be associated with the input pattern. The selection is made via a classification technique associated with each classifier.

At least one confidence value associated with a modular classifier is calculated via a single classification technique common to all of the modular classifiers. The confidence value is reflective of the likelihood that an output class selected at the modular classifier is associated with the input pattern. The confidence values associated with the modular classifiers are processed and an associated classification result is selected.

In accordance with yet another aspect of the invention, a method is disclosed for adding an output class to an existing pattern recognition system. A modular classifier, capable of selecting a classification result via a first classification technique and calculating an associated confidence value via a second classification technique, is trained on sample patterns from at least one associated output class. The trained modular classifier is incorporated into an existing pattern recognition system with at least one additional modular classifier. The additional modular classifiers are capable of calculating a confidence value by the second classification technique, such that the confidence value of the trained modular classifier can be compared to the confidence value of the additional modular classifier to determine which classification result should be accepted by the system.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 2 is a functional schematic of a modular classification architecture;

FIG. 3 is a functional schematic of a modular classifier;

FIG. 4 a flow diagram illustrating the training of a modular classifier;

DETAILED DESCRIPTION OF THE INVENTION

Figure 1:
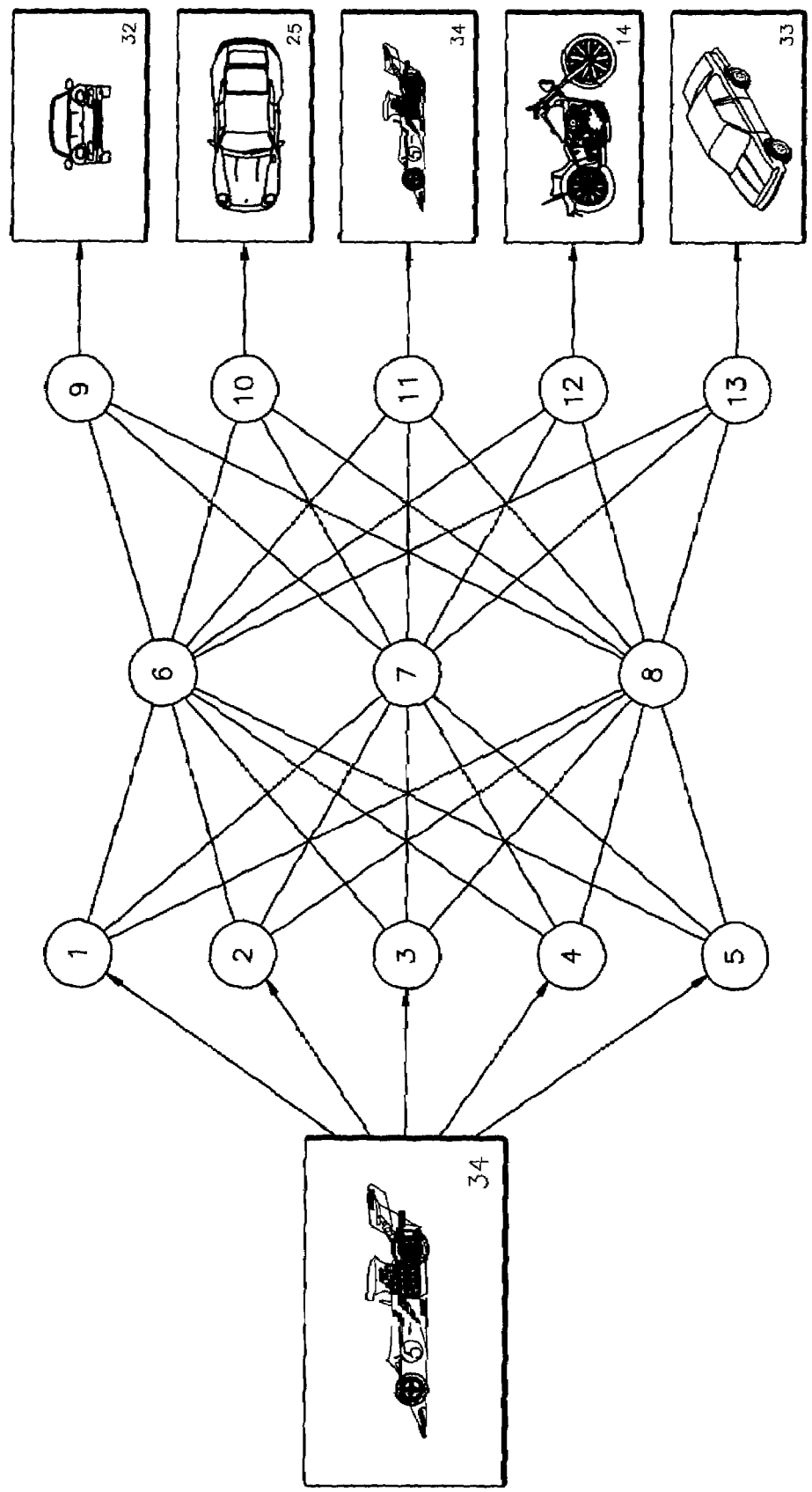
FIG. 1 is an illustration of an exemplary neural network utilized for pattern recognition.

In accordance with the present invention, a method for classifying an input pattern via a modular classification system is described. The modular classification system may be applied to any pattern recognition task, including, for example, OCR, speech translation, and image analysis in medical, military, and industrial applications.

In a modular classification architecture, each individual object within the architecture is structured to be easily upgraded or improved without affecting the remainder of the recognition system. Objects are defined to be interchangeable, such that new classes and new techniques for analysis can be quickly implemented in the system. For example, in the present invention, modular classifiers are used to allow for rapid introduction of new classes. These classifiers may be trained separately from the rest of the system and incorporated into the classification architecture as a free-standing classifier object.

In a preferred embodiment, all components of the system would be modular, including objects for retrieving a candidate pattern, any preprocessing stages, feature extraction objects, and any post-classification processing stages. Each object would have standard input and output interfaces to allow them to be easily implemented into a new system.

FIG. 1 illustrates a neural network that might be used in a pattern recognition task. The illustrated neural network is a three-layer back-propagation neural network used in a pattern classification system. It should be noted here, that the neural network illustrated in FIG. 1 is a simple example solely for the purposes of illustration. Any non-trivial application involving a neural network, including pattern classification would require a network with many more nodes in each layer. In addition, additional hidden layers may be required.

In the illustrated example, an input layer comprises five input nodes, 1–5. A node, generally speaking, is a processing unit of a neural network. A node may receive multiple inputs from prior layers which it processes according to an internal formula. The output of this processing may be provided to multiple other nodes in subsequent layers. The functioning of nodes within a neural network is designed to mimic the function of neurons within a human brain.

Each of the five input nodes 1–5 receives input signals with values relating to features of an input pattern. By way of example, the signal values could relate to the portion of an image within a particular range of grayscale brightness. Alternatively, the signal values could relate to the average frequency of an audio signal over a particular segment of a recording. Preferably, a large number of input nodes will be used, receiving signal values derived from a variety of pattern features.

Each input node sends a signal to each of three intermediate nodes 6–8 in the hidden layer. The value represented by each signal will be based upon the value of the signal received at the input node. It will be appreciated, of course, that in practice, a classification neural network may have a number of hidden layers, depending on the nature of the classification task.

Each connection between nodes of different layers is characterized by an individual weight. These weights are established during the training of the neural network. The value of the signal provided to the hidden layer by the input nodes is derived by multiplying the value of the original input signal at the input node by the weight of the connection between the input node and the intermediate node. Thus, each intermediate node receives a signal from each of the input nodes, but due to the individualized weight of each connection, each intermediate node may receive a signal of different value from each input node. For example, assume that the input signal at node 1 is of a value of 5 and the weights of the connections between node 1 and nodes 6–8 are 0.6, 0.2, and 0.4 respectively. The signals passed from node 1 to the intermediate nodes 6–8 will have values of 3, 1, and 2.

Each intermediate node 6–8 sums the weighted input signals it receives. This input sum may include a constant bias input at each node. The sum of the inputs is provided into a transfer function within the node to compute an output. A number of transfer functions can be used within a neural network of this type. By way of example, a threshold function may be used, where the node outputs a constant value when the summed inputs exceed a predetermined threshold. Alternatively, a linear or sigmoidal function may be used, passing the summed input signals or a sigmoidal transform of the value of the input sum to the nodes of the next layer.

Regardless of the transfer function used, the intermediate nodes 6–8 pass a signal with the computed output value to each of the nodes 9–13 of the output layer. An individual intermediate node (i.e. 7) will send the same output signal to each of the output nodes 9–13, but like the input values described above, the output signal value may be weighted differently at each individual connection. The weighted output signals from the intermediate nodes are summed to produce an output signal. Again, this sum may include a constant bias input.

Each output node represents an output class of the classifier. The value of the output signal produced at each output node represents the probability that a given input sample belongs to the associated class. In the example system, the class with the highest associated probability is selected, so long as the probability exceeds a predetermined threshold value. The value represented by the output signal is retained as a confidence value of the classification.

FIG. 2 illustrates a pattern recognition system 20 incorporating a global classification stage 22 utilizing modular classifiers 24A–24N. A pattern 26 is input into the pattern recognition system 20. The input pattern 26 enters a global preprocessing stage 28, where various representations of the input pattern are produced for later processing. By way of example, image data might be normalized, divided into segments, and saved as separate images for later analysis. Audio data might be filtered to reduce noise levels and similarly segmented into sections of interest. The pattern data is then passed to the global classification stage 22.

It should be noted that the pattern recognition system 20 will typically be implemented as a computer program, preferably a program simulating, at least in part, the functioning of a neural network. Specifically, data analysis within the classification tasks performed by the system will generally take place within a simulated neural network system. Accordingly, the structures described herein may be considered to refer to individual modules and tasks within that program.

The global classification stage 22 contains a plurality of modular classifiers 24A–24N, each including at least one associated output class. The modular classifiers 24A–24N compare data from the input pattern 26 to known training data to produce a classification result and an associated confidence value assessing the validity of the classification result.

A classification system utilizing modular architecture is designed to be easily updated to include new output classes. Instead of retraining the entire system to include data on the new classes, a modular classifier, with the new classes as output classes, may be separately trained and incorporated into the system. In such a case, the system will receive a classification result and an associated confidence value from each of the modular classifiers. In order for any useful comparison to be made between these results, it is necessary that the confidence values received from each classifier have common significance. By "common significance", it is meant that the confidence values have quantifiable meaning relative to one other, such that valid comparisons may be made based upon their magnitude.

The control stage 30 determines which of the modular classifiers will be operative at any particular time. The control stage may select modular classifiers to operate by any number of principles. The simplest of these would involve merely operating the classifiers in a default order, but operating the classifiers in a random or other system-determined order may be advantageous in some applications. The modular classifiers may also be operated simultaneously when practical.

Regardless of the method of selection it uses, the control stage 30 should be easily updateable. Put plainly, it must be possible to update the control stage to recognize the existence of a new classifier without retraining the entire system. This allows new classes to be quickly integrated into the system upon the addition of a new modular classifier.

Focusing on the individual classifiers, each modular classifier (e.g. 24A) contains a preprocessing stage 34A–34N. The preprocessing stage (e.g. 34A) modifies the incoming pattern data to facilitate later feature extraction. The specific modifications performed on the data depend upon the types of feature data that will later be extracted from the image. Using the example of an image recognition system, if extraction of the selected feature type is unacceptably processing intensive for large images, the image may be downscaled during preprocessing. Other examples will be apparent to one skilled in the art.

A feature extraction stage 36A–36N at each classifier analyzes preselected features of the pattern. The selected features can be literally any values derived from the pattern that vary sufficiently among the various output classes to serve as a basis for discriminating between them. Numerical data extracted from the features can be conceived for computational purposes as a feature vector, with each element of the vector representing a value derived from one feature within the pattern. Possible features analysis in an OCR application might include dividing the image into a number of regions and recording the proportion of each region occupied by the character. In an image recognition system, the average grayscale value of various regions of the image might be recorded as a feature.

The extracted feature vector is then inputted into a classification stage 38A–38N. At the classification stage (e.g. 38A), the classifier (e.g. 24A) generates a classification result and an associated confidence value. The confidence values produced by the modular classifiers must possess common significance. Put simply, the confidence value produced by each classifier must be scaled such that meaningful comparison is possible among the various classifier inputs. Accordingly, in a modular architecture, it is necessary to use a common confidence estimation technique throughout the various classifiers. While the classifier may produce its classification result in any practical manner, it is necessary to use an independent technique to calculate a confidence value in order to standardize the confidence values for comparison.

Typically, each classification stage 38A–38N will include parameters drawn from a series of training samples introduced prior to operation of the system. In a training mode, internal class parameters are computed from a "training set" of pattern samples. To compute the training data, numerous representative pattern samples are needed for each output class. The pattern samples are converted to feature vectors via preprocessing and feature extraction stages similar to that described above. The training data for each modular classifier typically includes statistics extracted from these feature vectors.

The confidence value is then passed to a processing stage 40. During the processing stage 40, the confidence values produced by the modular classifiers 24A–24N are analyzed to select an output class for the input pattern. The analysis of the confidence values can take several forms. The various confidence values can be analyzed as a group to determine which class produces the largest confidence value. Alternately, the confidence values may be received in sequence, and the first confidence value to exceed a predetermined threshold will be selected. Regardless of the method of selection used, the class chosen by the selected classifier will be output by the system.

FIG. 3 illustrates an example modular classifier 124 in the context of a postal indicia recognition system. Processing within the modular classifier 124 begins with the input of an image segment into the preprocessing stage 134. The preprocessing stage 134 prepares the incoming image segment for later processing. For example, the preprocessing stage might downscale the image into a smaller image to expedite feature extraction. The "Scaled 16" features discussed below are one type of feature in which such downscaling is useful. Other examples should be apparent to one skilled in the art.

The preprocessed image progresses to the feature extraction stage 136, which generates data from selected features within the image. Features can be selected by any reasonable method, but typically, appropriate features will be selected by experimentation. It should be noted that even within the same modular classifier, different feature data may be extracted for different types of analysis. For example, the two feature extractors 136A and 136B in the illustrated modular classifier 124 may focus on different features within the image.

For the purposes of computation, the feature data can be conceived as a feature vector. Each vector element represents a feature variable, a numerical value derived from a selected feature of the image. In the disclosed embodiment, a thirty-two element feature vector is used, including sixteen histogram feature variables, and sixteen "Scaled 16" feature variables.

A grayscale image consists of a number of individual pixels, each possessing an individual level of brightness, or grayscale value. The histogram portion of the feature vector focuses on the grayscale value of the individual pixels within the image. Each of the sixteen histogram variables represents a range of grayscale values. The values for the histogram feature variables are derived from a count of the number of pixels within the image having a grayscale value within each range. By way of example, the first histogram feature variable might represent the number of pixels falling within the lightest sixteenth of the range all possible grayscale values.

The "Scaled 16" variables represent the average grayscale values of the pixels within sixteen preselected areas of the image. By way of example, the sixteen areas may be defined by a 4×4 equally spaced grid superimposed across the image. Thus, the first variable would represent the average or summed value of the pixels within the upper left region of the grid.

Continuing with the illustrated example, the extracted feature vector is inputted to a classification stage (e.g. 138). The classification stage (e.g. 138) compares the feature vector to known parameters for the class to determine the likelihood that the class is associated with the input vector. In the illustrated example, this occurs in two stages. Initially, the feature vector is inputted into a class selection stage 144. At the class selection stage 144, the modular classifier 124 determines which of its associated output classes is most likely to contain the input pattern. A number of techniques known in the art are available for making this comparison. The chosen technique need not produce useful absolute confidence values The classification technique used at the class selection stage 144 will vary among the modular classifiers. Modular classifiers addressing tasks with low dimensionality (i.e. a small number of output classes and feature variables) could use any known system, such as a Bayesian classification technique. Classifiers performing a task with a higher dimensionality might require a less computationally intensive approach. Of course, classifiers with only one associated output class would merely select that output class at the class selection stage 144.

When an output class is selected, the decision is passed to a confidence calculation stage 146. The classification technique used at this stage will be common to all modular classifiers in a particular classification system. The chosen technique must compute a meaningful confidence value for the one or more classes it determines. Many classification techniques accurately select an output class, but sacrifice the validity of the confidence output for the sake of computation time. Such techniques are not useful within the present invention because of the poor performance of their confidence outputs. Accordingly, careful selection of the classification technique is necessary. Radial basis function techniques and probabilistic neural networks are often selected for applications requiring strong confidence outputs.

In the illustrated example, a confidence value is obtained within each classifier for the selected class via the following formula:

$$\text{Confidence} = 1 - \frac{\sum_{j=1}^{m}\left(\frac{|x_j - u_{ij}|}{\sigma_{ij}}\right)}{D_{i(\text{max})}} \qquad \text{Equation (1)}$$

where, $$\frac{|x_i - \mu_{ij}|}{\sigma_{ij}}$$

is clipped at $D_{max}$ i=the class selected by the sequencer
m=the number of feature variables
j=a feature vector index number
$x_j$=the $j^{th}$ element of input feature vector x
$u_{ij}$=the mean of the $j^{th}$ feature variable across the sample feature vectors in class i
$\sigma_{ij}$=the standard deviation of the $j^{th}$ feature variable across the sample feature vectors in class i
$D_{i(max)}$=The product of m and $D_{max}$ The use of clipping and a maximum value for the term $[|x-\mu|/\sigma]$ is necessary to bound the confidence computation in a manner suitable to conversion to a probability. This is accomplished by limiting the maximum value of each term (i.e. $|x_i-\mu_{ij}|/\sigma_{ij}$ for each i) to an experimentally determined clipping value, $D_{max}$. In the current embodiment, $D_{max}$ has been experimentally tuned to a value of 7 (in units of the confidence function).

The above formula is useful in a modular architecture because it produces an independent confidence value for each classification result. Accordingly, the confidence values associated with each result can be compared on an equal basis. Results from classifiers with differing numbers of output classes and varying classification techniques can be compared to produce a single result for the system.

To summarize, the following describes an example implementation of a modular image classification process. Initially, an image segment is inputted into each of the modular classifiers. This can be done sequentially or consecutively, but in the example embodiment, all of the modular classifiers receive the input image segment. The input image segments are then preprocessed. In the example embodiment, the image segments are downscaled to a smaller image to simplify feature extraction.

Features are then extracted from the image segments and complied into feature vectors. A first classification technique selects a class for each modular classifier from the classes it represents. The selection is intended to select the class in each modular classifier most likely to be associated with the input image segment.

A second classification technique computes a confidence value for the selected class. Selected classes and their associated confidence values are inputted to a selection stage. The selection stage selects the class with the highest confidence value.

As discussed above, modular classifiers may be trained separately from the system. In the addition of a new classifier, training data for a modular classifier is provided at a training stage. At the training stage, the system is exposed to a number of class samples, preprocessed in the manner discussed above. Feature data is extracted from each, and training data is calculated from this feature data.

The trained classifier is incorporated into the system at the control stage. Upon introduction of a new classifier, a computer object representing the classifier is added to the system, and the control stage is updated to reflect the introduction of the new classifier. The manner of this updating will vary, depending on the method by which the control stage activates classifiers during analysis. For example, if a standard order of classifiers is used, it will be necessary to establish a location for the new classifier in that order. If all classifiers run simultaneously, the control stage will merely need to be update to provide the input to the new classifier as well. Regardless of the method of activation, the control stage will provide input pattern data to the new classifier in the manner established with the existing classifiers after updating.

FIG. 4 shows a flow diagram illustrating the operation of a computer program 200 used to train a typical modular classifier via computer software. Prior to training, the operator gathers a sufficient number of pattern samples 202 belonging to the classes associated with the classifier. The number of pattern samples necessary for training is variable. The number of output classes, selected features, and type of classification technique used directly affect the number of pattern samples needed for good results for a particular classification system. Depending on the application, too many samples can be problematic, as it can take too long to process the training data without a significant gain in performance.

The actual training process begins at step 204 and proceeds to step 206. At step 206, the program retrieves a pattern sample 202 from memory. The process then proceeds to step 208, where the pattern sample is converted into feature data inputs that a classification stage 138 would receive under normal operation. After the sample feature data from each image are extracted, the results are stored, and the process returns to step 206. After all of the samples are analyzed, the process proceeds to step 210, where the feature data are saved.

The computation of training parameters begins in step 212, where the saved feature data are loaded into memory. After retrieving the feature data, the process progresses to step 214. At step 214, the program calculates statistics, such as the mean and standard deviation of the feature variables for each class. Intervariable statistics may also be calculated, including the covariance matrix of the sample set for each class. The process then advances to step 216 where it uses the feature data to compute the training parameters. After these calculations are performed, the process proceeds to step 218 where the training parameters are stored in memory and the training process ends.

This process produces the internal parameters needed by the modular classifiers. Usually training would occur prior to operation of the classifier. However, in systems such as the stamp recognition system described above, where classes may change frequently, the device will need to be retrained periodically. In applications such as text-character recognition, the classes are permanently fixed and retraining is not necessary.

It will be understood that the above description of the present invention is susceptible to various modifications, changes and adaptations, and the same are intended to be comprehended within the meaning and range of equivalents of the appended claims. In particular, it is expected that the classification techniques used in the individual modular classifiers may be varied without deviating from the intentions and principles of this invention.

Having described the invention, we claim:

1. A computer program product, implemented in a computer readable medium and operative in a data processing system, for use in classifying an input pattern into one of a plurality of output classes, the computer program product comprising:
    a plurality of modular classifiers, each representing a set of at least one associated output class, capable of being trained separately from the system and operative to select at least one of the set of at least one associated output class as a classification result, via an associated first classification technique, the associated first classification techniques varying across the plurality of modular classifiers, and compute an associated confidence value possessing common significance across tho classifiers via a second classification technique that is common across the plurality of modular classifiers; and
    a processing stage that processes the confidence values from the plurality of modular classifiers and selects an associated classification result.

2. A computer program product as set forth in claim 1, wherein the first classification technique is a Bayesian classification technique for at least one of the plurality of modular classifiers.

3. A computer program product as set forth in claim 1, wherein at least one of the plurality of modular classifiers represents only one associated output class and the first classification technique includes selecting the one associated output class.

4. A computer program product as set forth in claim 1, wherein the second classification technique utilizes a radial basis function.

5. A computer program product as set forth in claim 1, wherein the input pattern is a scanned image and each of the plurality of output classes represents a variety of postal indicia.

6. A computer program product as set forth in claim 1, wherein the input pattern is a scanned image and each of the plurality of output classes represents an alphanumeric character.

7. A computer program product as set forth in claim 1, wherein the processing stage compares the confidence values from each of the plurality of modular classifiers and selects the classification result associated with the largest confidence value.

8. A computer program product as set forth in claim 1, wherein the processing stage compares each confidence value to a predetermined threshold and selects the classification result associated with the first confidence value to exceed the threshold.

9. A method for classifying an input pattern into one of a plurality of output classes via a modular classification architecture comprising:
    selecting, at each of a plurality of modular classifiers that have at least one associated output class and are capable of being trained separately from one another, an output class most likely to be associated with the input pattern, via a classification technique associated with each classifier;
    calculating, at each of the plurality of modular classifiers, at least one confidence value associated with a modular classifier and reflective of the likelihood that an output class selected at the modular classifier is associated with the input pattern via a single classification technique common to all of the modular classifiers;
    processing the confidence values associated with at least one modular classifiers; and
    selecting an associated classification result.

10. A method as set forth in claim 9, wherein the classification technique associated with at least one of the plurality of modular classifiers is a Bayesian classification technique.

11. A method as set forth in claim 9, wherein at least one of the plurality of modular classifiers represents only one associated output class and the classification technique associated with the at least one modular classifier with only one associated class includes selecting the one associated output class.

12. A method as set forth in claim 9, wherein the classification technique common to all of the modular classifiers utilizes a radial basis function.

13. A method as set forth in claim 9, wherein the input pattern is a scanned image and each of the plurality of output classes represents a variety of postal indicia.

14. A method as set forth in claim 9, wherein the input pattern is a scanned image and each of the plurality of output classes represents an alphanumeric character.

15. A method as set forth in claim 9, wherein the step of processing the confidence values associated with at least one modular classifier includes determining the largest of the calculated confidence values and selecting the output class selected at the classifier associated with the largest confidence value.

16. A method as set forth in claim 9, wherein the step of calculating at least one confidence value includes calculating confidence values for the output classes selected at the plurality of modular classifiers in a predetermined order.

17. A method as set forth in claim 16, wherein the step of processing the confidence values from each confidence value includes comparing each confidence value to a predetermined threshold and selecting the output class selected at the modular classifier associated with the first confidence value to exceed the threshold.

18. A method for classifying an input pattern into one of a plurality of output classes via a modular classification architecture comprising:
    selecting, at each of a plurality of modular classifiers having at least one associated output class, an output class most likely to be associated with the input pattern, via a first classification technique associated with each classifier;
    calculating, via a second classification technique common to all of the modular classifiers, at least one confidence value associated with a modular classifier and reflective of the likelihood that an output class selected at the modular classifier is associated with the input pattern; processing the confidence values associated with at least one modular classifiers, such that each confidence value is compared to a predetermined threshold; and selecting an associated classification result, such that the output class selected at the modular classifier associated with the first confidence value to exceed the threshold is selected.

19. The method of claim 18, wherein the first classification technique associated with a first of the plurality of modular classifiers is a Bayesian classification technique and the first classification technique associated with a second of the plurality of modular classifiers utilizes radial basis functions.

* * * * *